(12) United States Patent
Baudesson et al.

(10) Patent No.: US 7,738,268 B2
(45) Date of Patent: Jun. 15, 2010

(54) EMC FILTERING DEVICE IN A VARIABLE SPEED DRIVE

(75) Inventors: Phillipe Baudesson, La Boissiere (FR); Jean Lafontaine, Maisons Laffitte (FR); Alain Nourrisson, Pacy sur Eure (FR)

(73) Assignee: Schneider Toshiba Inverter Europe SAS, Pacy-Sur-Eure (FR)

( * ) Notice: Subject to any disclaimer, the term of this patent is extended or adjusted under 35 U.S.C. 154(b) by 438 days.

(21) Appl. No.: 11/757,071

(22) Filed: Jun. 1, 2007

(65) Prior Publication Data

US 2007/0296374 A1 Dec. 27, 2007

(30) Foreign Application Priority Data

Jun. 7, 2006 (FR) .................................. 06 52040

(51) Int. Cl.
*H02M 1/12* (2006.01)

(52) U.S. Cl. ........................................ 363/39

(58) Field of Classification Search .............. 363/39, 363/44, 46, 47
See application file for complete search history.

(56) References Cited

U.S. PATENT DOCUMENTS

| | | | | |
|---|---|---|---|---|
| 6,043,997 A | * | 3/2000 | He et al. | 363/44 |
| 6,567,283 B2 | * | 5/2003 | Welches | 363/89 |
| 6,906,474 B2 | * | 6/2005 | Trestman et al. | 315/224 |
| 7,276,859 B1 | * | 10/2007 | Trestman | 315/224 |
| 2002/0140524 A1 | * | 10/2002 | Gotz et al. | 333/181 |
| 2009/0027136 A1 | * | 1/2009 | Traa et al. | 333/12 |

FOREIGN PATENT DOCUMENTS

| | | |
|---|---|---|
| DE | 103 10 577 A1 | 9/2004 |
| WO | WO 03/105328 A1 | 12/2003 |

* cited by examiner

*Primary Examiner*—Adolf Berhane
(74) *Attorney, Agent, or Firm*—Oblon, Spivak, McClelland, Maier & Neustadt, L.L.P.

(57) ABSTRACT

The invention relates to a filtering device connected between a rectifier module of a variable speed drive and an alternating current power supply network, the filtering device comprising an EMC filter comprising a common-mode inductor having a winding on each phase of the power supply network, the windings being magnetically coupled together. The filtering device comprises a shunt circuit connected in parallel with at least one of the windings of the common-mode inductor, the shunt circuit comprising passive components and making it possible to shunt a common-mode current flowing in the common-mode inductor in a frequency zone about a resonance frequency of the EMC filter.

16 Claims, 2 Drawing Sheets

EMC FILTERING DEVICE IN A VARIABLE SPEED DRIVE

Figure 1:
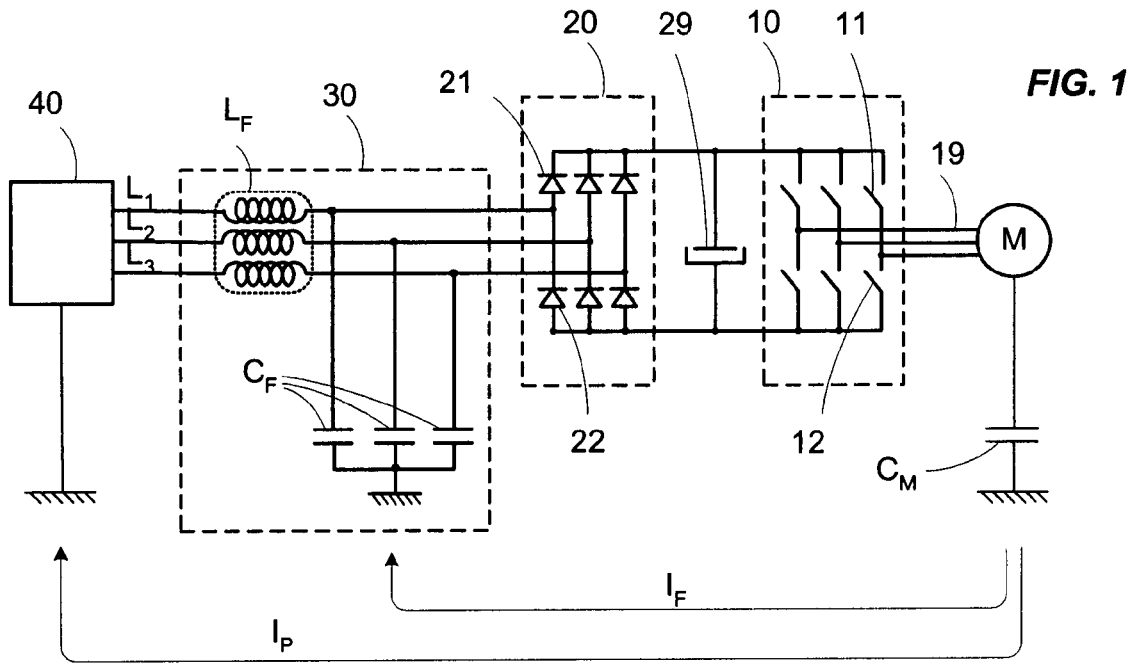

The present invention relates to a filtering device, in particular an EMC (electromagnetic compatibility) filtering device, used at the input of a variable speed drive of frequency converter type, which is powered by an alternating current power supply network and which is intended to control an electrical load, such as a synchronous or asynchronous electric motor. The invention also relates to a variable speed drive comprising such a filtering device.

As is known, a variable speed drive of frequency-converter type comprises a rectifier module which supplies a direct current voltage from an external alternating current power supply network and an inverter module (or chopper). This inverter module comprises power semiconductor electronic components to chop the continuous voltage in pulse width modulation (PWM) mode, so as to supply at the output, via a power cable, a pulsed variable electric voltage and a variable rotation frequency to the motor. A variable speed drive control device controls the conduction and blocking of the semiconductor components at the sampling frequency, to control the motor in PWM mode with an appropriate variable voltage.

The switching frequency for the PWM control of the power semiconductor components corresponds to the sampling frequency of the variable speed drive. Depending on the type and rating of the variable speed drive, this switching frequency generally varies between approximately 2 and 16 kHz, corresponding to sampling periods between 62 and 500 μs.

The switching of the power semiconductor electronic components generates at the output of the variable speed drive a common-mode voltage variation leading upstream and downstream of the conversion system to electromagnetic disturbances of the same mode, through an earth looping of the leakage currents due in particular to the stray capacitances of the motor and of the power cable. A filtering device is therefore often used to attenuate the common-mode currents absorbed in the electrical distribution network and prevent their propagation to the power supply network.

An EMC filter is placed upstream of the rectifier module of the variable speed drive and is connected between the alternating current power supply network and the rectifier module of the variable speed drive. According to the size and type of the variable speed drive, the filter can be either incorporated in the housing of the variable speed drive, or external to the variable speed drive. To satisfy in particular the current European standards concerning electromagnetic compatibility, the EMC filter needs to be effective in a frequency zone situated between 150 kHz and 30 MHz.

The EMC filter normally consists of a common-mode inductor comprising a winding on each phase of the power supply network and common-mode capacitors linked between each phase and earth, downstream of the common-mode inductor. It thus comprises a passive low-pass-type circuit with a cut-off frequency that makes it possible to obtain the desired attenuation of the common-mode currents in the frequency zone fixed by the standards.

The required cut-off frequency of the EMC filter sets the values of the common-mode capacitors and the inductor. The value of the common-mode capacitors is normally constant. However, the value of the common-mode inductor is strongly dependent on the common-mode currents passing through it. These currents are dependent on the common-mode voltage generated by the switching of the switches of the variable speed drive and of the stray capacitances from the main components, i.e. from the motor and the power cable. Depending on the accepted level of the common-mode currents, the common-mode inductor must be dimensioned not to saturate.

The EMC filter is a second-order filter, so this passive circuit has a resonance frequency close to its cut-off frequency. Thus, it may be that, in a certain frequency band about the resonance frequency, the EMC filter amplifies the common-mode currents instead of attenuating them, which can promote saturation of the inductor.

The value of this resonance frequency is obviously dependent on the value of the common-mode inductor, which depends on the value of the common-mode current. Therefore, the resonance frequency varies according to whether or not the variable speed drive is driving a load. Thus, the resonance frequency can be, for example, of the order of 8 to 16 kHz for an inductor of the EMC filter made of ferrite, and, for example, of the order of 2 to 8 kHz for an inductor made of nano-crystalline material. It happens that these values are close to the normal sampling frequency values of a variable speed drive.

For a more effective filtering, it would therefore be desirable to include a filtering device comprising means that make it possible to very simply and cost-effectively prevent the saturation of the common-mode inductor of the EMC filter in the resonance frequency zone of the EMC filter (in the region of a few kHz), without in any way compromising the performance levels of the EMC filter in the normative filtering frequency zone, above 150 kHz.

This is why the invention discloses a filtering device connected between a rectifier module of a variable speed drive and an alternating current power supply network, the filtering device comprising an EMC filter comprising a common-mode inductor having a winding on each phase of the power supply network, said windings being magnetically coupled together. The filtering device comprises a shunt circuit connected in parallel with at least one of the windings of the common-mode inductor, the shunt circuit comprising passive components and making it possible to shunt a common-mode current flowing in the common-mode inductor in a frequency zone about a resonance frequency of the EMC filter.

According to a first embodiment, the shunt circuit comprises a shunt inductor, the value of which is less than the value of the common-mode inductor in the resonance frequency zone of the EMC filter and is greater than the value of the common-mode inductor in the filtering frequency zone of the EMC filter. The common-mode inductor is made of nano-crystalline material and the shunt inductor is made of ferrite. According to one characteristic, the shunt circuit also comprises a shunt resistor linked in series with the shunt inductor.

According to another embodiment, the shunt circuit comprises a first band-pass filter connected in parallel with at least one of the windings of the common-mode inductor and consisting of a first inductor linked in series with a first capacitor, the impedance of the first band-pass filter being minimal about a first value of the resonance frequency of the EMC filter. Preferably, the common-mode inductor and the inductor of the first band-pass filter are made of ferrite.

According to one characteristic, the shunt circuit also comprises a second band-pass filter connected in parallel with at least one of the windings of the common-mode inductor and consisting of a second inductor linked in series with a second capacitor, the impedance of the second band-pass filter being minimal about a second value of the resonance frequency of the EMC filter. Preferably, the inductor of the second band-pass filter is made of ferrite.

The invention also relates to a variable speed drive powered by an external alternating current power supply network and intended to control an electric motor, and comprising such a filtering device.

Figure 2:
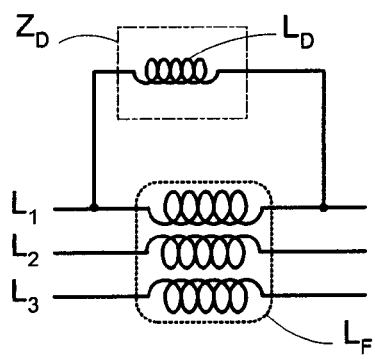
Figure 3:
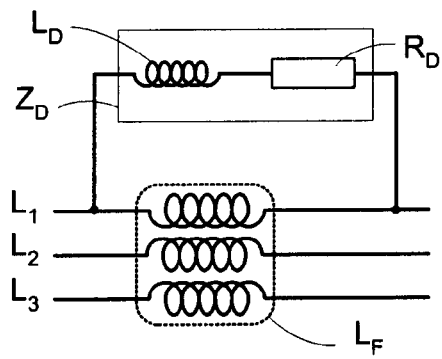
Figure 5:
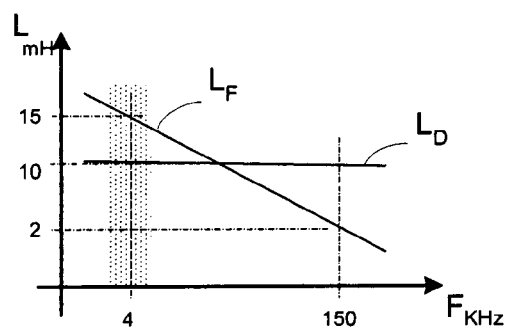
Figure 4:
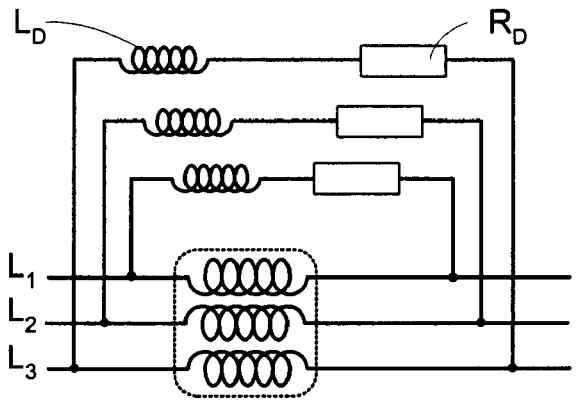
Figure 6:
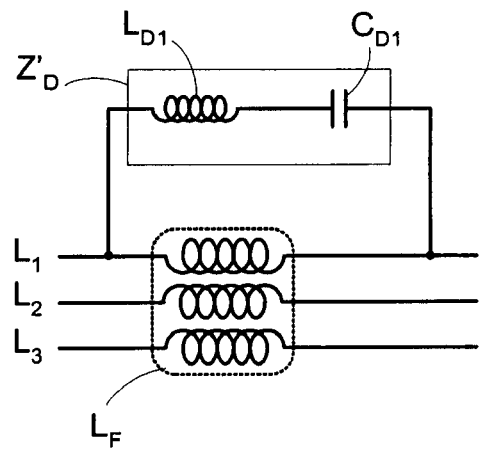
Figure 7:
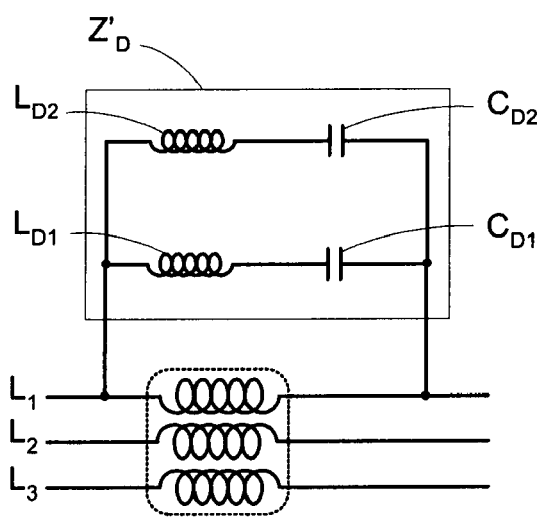

Other characteristics and advantages will become apparent from the detailed description that follows, with reference to one embodiment given by way of example and represented by the appended drawings in which:

FIG. 1 shows a known simplified schematic diagram of a variable speed drive,

FIG. 2 represents a first embodiment of an EMC filtering device according to the invention, FIG. 3 shows a variant of the first embodiment, FIG. 4 shows a second variant of the first embodiment, FIG. 5 is a simplified diagram of inductance values as a function of frequency, FIG. 6 represents a second embodiment of an EMC filtering device according to the invention, FIG. 7 shows a variant of the second embodiment.

With reference to the simplified schematic diagram of FIG. 1, a variable speed drive is intended to control a synchronous or asynchronous-type electric motor M. The variable speed drive comprises an inverter module 10 linked to the motor M by a power cable 19. For each phase of the motor, the inverter module 10 comprises two power semiconductor electronic components 11, 12, of IGBT or other type (represented in FIG. 1 as simple switches to simplify the drawing), capable of supplying a PWM-mode pulsed voltage to the motor M from a DC voltage bus. Each conductor of the power cable 19 is linked between the components 11 and 12 corresponding to the respective phases.

Upstream of the inverter module 10, the variable speed drive also comprises a rectifier module 20 which delivers the DC voltage bus to power the inverter module 10. A ballast capacitor 29 is placed between the rectifier module 20 and the inverter module 10.

The rectifier module 20 is powered by an external power source 40 supplying a three-phase AC voltage L1, L2, L3, for example in a TT-type system in which the neutral is linked to earth. Conventionally, the rectifier module 20 comprises, for each phase, a diode bridge 21, 22, arranged to provide the DC voltage bus. The example described provides for an external three-phase power supply network, but the invention applies in an equivalent manner to a single-phase power supply network. Similarly, the motor M described in FIG. 1 is powered in three-phase mode, but the invention obviously also applies to an electric motor powered in single-phase mode.

An EMC filter 30 is positioned between the external power source 40 and the rectifier module 20. The characteristics of this EMC filter are calculated to enable the variable speed drive to satisfy the EMC standards in a frequency zone above 150 kHz. The EMC filter 30 comprises a common-mode inductor $L_F$ connected in series between the source 40 and the rectifier module 20. It consists of three windings for the three phases L1, L2, L3 of the input three-phase alternating current network (one winding per phase), these three windings being magnetically coupled together. The EMC filter 30 also comprises common-mode capacitors $C_F$ connected between each phase L1, L2, L3 and earth, downstream of the common-mode inductor $L_F$.

It is known that the motor M and the cable 19 have stray capacitances distributed to earth that can be modelled by a common capacitance $C_M$. The switching of the components 11, 12 of the inverter module 10 causes very wide voltage variations which provoke the creation of a common-mode current $I_{MC}$ equal to $I_{MC}=C_M*dV/dt$.

This common-mode current $I_{MC}$ is looped by the earth via the motor+cable capacitance $C_M$, following either the path denoted $I_F$ in FIG. 1, via the diodes 21, the components 11, $C_M$, $C_F$ (or 22, 12, $C_M$, $C_F$), or a path denoted $I_P$ via the diodes 21, the components 11, $C_M$, 40, $L_F$ (or 22, 12, $C_M$, 40, $L_F$). To minimize the propagation of the disturbances to the external network, it is obviously desirable to favour the path $I_F$ over the path $I_P$ to prevent the disturbances being propagated to the external electrical network. To this end, low impedance values are therefore used for the common-mode capacitors $C_{F1}$, $C_{F2}$, $C_{F3}$ and high impedance values are used for the common-mode inductor $L_F$.

Nevertheless, the longer the cable 19 is, the more the capacitance $C_M$ increases and the more the common-mode current $I_{MC}$ increases. There is then a risk of saturation of the common-mode inductor $L_F$ in certain applications. In this case, the path $I_F$ risks no longer being favoured which will adversely affect the performance levels of the EMC filter. This risk of saturation can be accentuated at the moment of the switchings of the power semiconductor components 11, 12, that is, at a switching frequency for the PWM control of the power components. This switching frequency corresponds to the sampling frequency of the variable speed drive, that is, generally between approximately 2 and 16 kHz.

Thus, at this sampling frequency, there is a risk of seeing current spikes appear on the power supply network side, due to the saturation of the common-mode inductor $L_F$ when the common-mode current $I_{MC}$, generated by the switchings of the components 11, 12 of the inverter module 10, is high and amplified by the resonance of the input EMC filter. It is therefore essential to find means of damping the resonance of the EMC filter and so limit the rise in the common-mode current $I_{MC}$ flowing in the common-mode inductor $L_F$.

This is why the invention proposes a filtering device that is capable of damping the resonance of the EMC filter and limiting the rise in the common-mode current $I_{MC}$ in the resonance frequency zone of the EMC filter, without influencing the performance levels of the EMC filter in the frequency zone above 150 kHz, to satisfy the EMC standards.

For this, the filtering device comprises a shunt circuit $Z_D$, $Z'_D$ connected in parallel with at least one of the windings of the common-mode inductor $L_F$. The shunt circuit $Z_D$, $Z'_D$ is simply made up with passive components (that is, components of resistor, inductor, capacitor type) chosen so as to be able to shunt a major part of the common-mode current to the shunt circuit, for a frequency zone about a resonance frequency of the EMC filter. Thus, in this particular frequency zone, it therefore makes it possible to reduce the common-mode current flowing in the common-mode inductor of the EMC filter, so as to prevent its saturation.

FIGS. 2 to 4 relate to a first embodiment of the filtering device, which is suitable in particular when the common-mode inductor $L_F$ is made of nano-crystalline material. FIGS. 6 and 7 relate to a second embodiment of the filtering device, which is suitable in particular when the common-mode inductor $L_F$ is made of ferrite.

FIG. 2 shows a first exemplary embodiment of an extremely simple and cost-effective passive filtering device. The filtering device comprises a shunt circuit $Z_D$ connected in parallel with one of the windings of the common-mode inductor $L_F$. This shunt circuit $Z_D$ comprises only a shunt inductor $L_D$.

The shunt inductor $L_D$ is chosen so that, in the frequency zone about the resonance frequency of the EMC filter (a few kHz), the value of the inductor $L_D$ is less than the value of the common-mode inductor $L_F$, so as to favour the passage of the current in the shunt circuit via the shunt inductor $L_D$ in this frequency zone.

Conversely, the inductor $L_D$ is also chosen so that, in the filtering frequency zone of the EMC filtering device (above 150 kHz), the value of the inductor $L_D$ is greater than the value of the common-mode inductor $L_F$, so as to favour the passage of the current in the main circuit via the common-mode inductor $L_F$ in this frequency zone, and therefore so as to retain the filtering capacitances of the EMC filter.

The shunt inductor $L_D$ comprises an internal resistor which makes it possible to favour the passage of the current in the common-mode inductor $L_F$ over the shunt circuit $Z_D$, for the power supply frequency zone of the alternating current network (50 or 60 Hz), because the aim is in practice to favour the passage of the current in the main circuit at this frequency. If the internal resistance of the inductor $L_D$ is not sufficiently greater than that of the common-mode inductor $L_F$, the invention provides for a variant represented in FIG. 3 in which the shunt circuit $Z_D$ consists of a shunt inductor $L_D$ in series with a shunt resistor $R_D$, so as to favour the passage of the current in the main circuit for the power supply frequency zone of the network.

In Summary,

In the power supply frequency zone of the network, the passage of the current is favoured in the main circuit, through the internal resistance of the inductor $L_D$, or thanks to the additional presence of the shunt resistor $R_D$.

In the sampling frequency zone of the variable speed drive and in the resonance frequency zone of the EMC filter, the aim is to avoid the saturation of the common-mode inductor $L_F$ of the EMC filter, and the passage of the current in the shunt circuit is therefore favoured through an inductor $L_D$ value less than that of the inductor $L_F$.

In the filtering frequency zone of the EMC filter, the aim is to retain the performance characteristics of the EMC filter and the passage of the current in the main circuit is therefore favoured through an inductor $L_D$ value greater than that of the inductor $L_F$.

To arrive at these characteristics, the windings of the common-mode inductor $L_F$ are preferably made of nano-crystalline material, so as to have an inductor value which drops sharply according to frequency. Also, the shunt inductor $L_D$ is preferably made of ferrite material which has the particular feature of having an inductor value which varies much less according to frequency. FIG. 5 shows a simplified diagram of the values of the inductors $L_D$ and $L_F$ as a function of the frequencies, corresponding to a common-mode inductor $L_F$ made of nano-crystalline material and a shunt inductor $L_D$ made of ferrite. This diagram shows that, for an appropriate dimensioning of the inductors $L_D$ and $L_F$, the passage of current is favoured in the shunt inductor $L_D$ for the resonance frequency zone of the EMC filter (because $L_D<L_F$) and in the common-mode inductor $L_F$ for the frequency zone above 150 kHz (because $L_D>L_F$).

The filtering device of FIGS. 2 and 3 shows a shunt circuit for a single phase of the main circuit L1, L2, L3. This shunt circuit is connected in parallel with just one of the windings of the common-mode inductor $L_F$. The effect generated by this shunt circuit is, nevertheless, reflected on the other phases because, since the windings of the common-mode inductor $L_F$ are magnetically coupled together, the magnetic fluxes balance out between these windings, and a rise/drop in current in one of the phases also results in a slight rise/drop in current in the other phase or phases.

According to a variant shown in FIG. 4, the shunt circuit can also have a shunt inductor $L_D$ in parallel with each winding of the common-mode inductor $L_F$. FIG. 4 therefore shows three shunt inductors $L_D$, having identical characteristics and corresponding to the three phases of the power supply network L1, L2, L3. In this case, the three shunt inductors are preferably not magnetically coupled together. Each shunt inductor $L_D$ may or may not be coupled in series with a shunt resistor $R_D$.

FIG. 6 shows one example of a second embodiment of the invention. This second embodiment is more suitable when the common-mode inductor is made of ferrite, that is, with an inductor value that varies little as a function of frequency. In this case, the invention provides for a shunt circuit $Z'_D$ connected in parallel with at least one of the windings of the common-mode inductor $L_F$.

This shunt circuit $Z'_D$ comprises a first band-pass filter consisting of a first inductor $L_{D1}$ linked in series with a first capacitor $C_{D1}$. The characteristics of the inductor $L_{D1}$ and of the capacitor $C_{D1}$ are chosen so that the impedance of the first band-pass filter is minimal about a first value of the resonance frequency of the EMC filter. Thus, only in a frequency zone close to this resonance frequency value, the impedance of the shunt circuit $Z'_D$ will be less than the impedance of the common-mode inductor $L_F$, and the common-mode current will therefore be preferably diverted into the shunt circuit $Z'_D$ which makes it possible to prevent the saturation of the common-mode inductor $L_F$ without modifying the performance characteristics of the EMC filter in the filtering frequency zone of the EMC filter (above 150 kHz).

Nevertheless, since the resonance frequency of the EMC filter can vary according to the load of the variable speed drive, it could be that the first band-pass filter is not always sufficiently effective for the various values of the resonance frequency.

This is why FIG. 7 shows a variant of the second embodiment which provides for the shunt circuit $Z'_D$ to additionally include a second band-pass filter connected in parallel with at least one of the windings of the common-mode inductor $L_F$ and in parallel with the first band-pass filter. This second filter consists of a second inductor $L_{D2}$ linked in series with a second capacitor $C_{D2}$. The characteristics of the inductor $L_{D2}$ and of the capacitor $C_{D2}$ are chosen so that the impedance of the second band-pass filter is minimal about a second value of the resonance frequency of the EMC filter, different from the first value.

It is possible, for example, to choose characteristics of $L_{D1}$ and $C_{D1}$ suited to a first value of the resonance frequency corresponding to the operation of the variable speed drive linked to a motor that is off-load and characteristics of $L_{D2}$ and $C_{D2}$ suitable for a second value of the resonance frequency corresponding to the operation of the variable speed drive linked to a motor at maximum load, so as to cover the widest possible range of different values of the resonance frequency of the EMC filter.

Obviously, it is possible, without departing from the context of the invention, to devise other variants and refinements of detail and even consider the use of equivalent means.

The invention claimed is:

1. An EMC (electromagnetic compatibility) filter connected between a rectifier module of a variable speed drive and an alternating current power supply network, the EMC filter comprising:
   a common-mode inductor having a winding on each phase of the power supply network, said windings being magnetically coupled together; and a shunt circuit connected in parallel with at least one of the windings of the common-mode inductor, the shunt circuit including passive components for shunting a common-mode current flowing in the common-mode inductor in a frequency zone close to a value of a resonance frequency of the EMC filter.

2. Filtering device according to claim 1, wherein the shunt circuit includes a shunt inductor, the value of which is less than the value of the common-mode inductor in the frequency zone close to the value of the resonance frequency of the EMC filter, and is greater than the value of the common-mode inductor in the filtering frequency zone of the EMC filter.

3. Filtering device according to claim 2, wherein the shunt inductor is made of ferrite and the common-mode inductor is made of nano-crystalline material.

4. Filtering device according to claim 2, wherein the shunt circuit further includes a shunt resistor linked in series with the shunt inductor.

5. Filtering device according to one of claims 2 to 4, wherein the shunt circuit includes a plurality of shunt inductors, each shunt inductor being connected in parallel, respectively, with each winding of the common-mode inductor.

6. Filtering device according to claim 1, wherein the shunt circuit includes a first band-pass filter connected in parallel with at least one of the windings of the common-mode inductor and having a first inductor linked in series with a first capacitor, the impedance of the first band-pass filter being minimal compared to a first value of the resonance frequency of the EMC filter.

7. Filtering device according to claim 6, wherein the shunt circuit includes a second band-pass filter connected in parallel with at least one of the windings of the common-mode inductor and having a second inductor linked in series with a second capacitor, the impedance of the second band-pass filter being minimal compared to a second value of the resonance frequency of the EMC filter.

8. Filtering device according to claim 6 or 7, wherein the common-mode inductor is made of ferrite.

9. A variable speed drive powered by an external alternating current power supply network and intended to control an electric motor, the variable speed drive having a rectifier module, wherein an EMC filter according to claim 1 is provided between the rectifier module of the variable speed drive and the alternating current power supply network.

10. A variable speed drive powered by an external alternating current power supply network and intended to control an electric motor, the variable speed drive having a rectifier module, wherein an EMC filter according to claim 2 is provided between the rectifier module of the variable speed drive and the alternating current power supply network.

11. A variable speed drive powered by an external alternating current power supply network and intended to control an electric motor, the variable speed drive having a rectifier module, wherein an EMC filter according to claim 3 is provided between the rectifier module of the variable speed drive and the alternating current power supply network.

12. A variable speed drive powered by an external alternating current power supply network and intended to control an electric motor, the variable speed drive having a rectifier module, wherein an EMC filter according to claim 4 is provided between the rectifier module of the variable speed drive and the alternating current power supply network.

13. A variable speed drive powered by an external alternating current power supply network and intended to control an electric motor, the variable speed drive having a rectifier module, wherein an EMC filter according to claim 5 is provided between the rectifier module of the variable speed drive and the alternating current power supply network.

14. A variable speed drive powered by an external alternating current power supply network and intended to control an electric motor, the variable speed drive having a rectifier module, wherein an EMC filter according to claim 6 is provided between the rectifier module of the variable speed drive and the alternating current power supply network.

15. A variable speed drive powered by an external alternating current power supply network and intended to control an electric motor, the variable speed drive having a rectifier module, wherein an EMC filter according to claim 7 is provided between the rectifier module of the variable speed drive and the alternating current power supply network.

16. A variable speed drive powered by an external alternating current power supply network and intended to control an electric motor, the variable speed drive having a rectifier module, wherein an EMC filter according to claim 8 is provided between the rectifier module of the variable speed drive and the alternating current power supply network.

* * * * *